(12) United States Patent
Chao et al.

(10) Patent No.: US 6,483,799 B1
(45) Date of Patent: Nov. 19, 2002

(54) REWRITABLE DVD-RAM DISC

(75) Inventors: Zu-Wen Chao, Hsinchu; Guo-Zua Wu, Taichung; Der-Ray Huang, Hsinchu; Wei-Cheng Chen, Chang-Hua, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/490,024

(22) Filed: Jan. 21, 2000

(30) Foreign Application Priority Data

Dec. 16, 1999 (TW) ........................ 88122148 A

(51) Int. Cl.$^7$ ..................... G11B 23/00; G11B 5/84
(52) U.S. Cl. ........................ 369/258; 369/291
(58) Field of Search ............... 369/258, 44.26, 369/53.35, 121, 282, 275.1, 275.2, 275.4, 111, 291

(56) References Cited

U.S. PATENT DOCUMENTS

| | | | | |
|---|---|---|---|---|
| 5,734,787 A | * | 3/1998 | Yonemitsu et al. | 386/111 |
| 5,914,926 A | * | 6/1999 | Maeno et al. | 369/54 |
| 5,986,997 A | * | 11/1999 | Chanllener, IV | 369/121 |
| 6,125,101 A | * | 9/2000 | Kikukawa et al. | 369/275.4 |
| 6,167,021 A | * | 12/2000 | Yoshida et al. | 369/275.2 |
| 6,195,326 B1 | * | 2/2001 | Yoshinari et al. | 369/275.4 |
| 6,226,256 B1 | * | 5/2001 | Utsunomiya et al. | 369/275.3 |
| 6,256,282 B1 | * | 7/2001 | Yamagami et al. | 369/275.3 |
| 6,269,070 B1 | * | 7/2001 | Kikuchi et al. | 369/275.4 |
| 6,279,959 B1 | * | 8/2001 | Nishizawa | 369/44.24 |

* cited by examiner

*Primary Examiner*—Allen Cao
(74) *Attorney, Agent, or Firm*—J.C. Patents

(57) ABSTRACT

A rewritable DVD-RAM disc. By changing the location or dimension of the lead-out area of the DVD-RAM disc, the data area of the disc can be enlarged. The enlarged area of the disc can be flexibly applied to the user area, the main spare area, or the backup spare area.

16 Claims, 2 Drawing Sheets

REWRITABLE DVD-RAM DISC

CROSS-REFERENCE TO RELATED APPLICATION

This application claims the priority benefit of Taiwan application Ser. No. 88122148, filed Dec. 16, 1999.

BACKGROUND OF THE INVENTION

1. Field of the Invention

The invention relates in general to a DVD-RAM disc. More particularly, this invention relates to rewritable DVD-RAM disc.

2. Description of the Related Art

One specification of the DVD-RAM version 2.0 disc has been provided in July, 1999. In this specification, the area and the parameters of the DVD-RAM have been defined. The specification includes a track pitch of 0.615 micron and a total capacity of 4.726 Giga-bytes. Referring to FIG. 1A and FIG. 1B, an area distribution of a conventional DVD-RAM disc is shown. In FIG. 1A and FIG. 1B, the DVD-RAM disc comprise a user area 14 of 4.7 Giga-bytes, a spare area of 146 Mega-bytes, a lead-in area 10 and a lead-out area 16.

The spare area 12 further comprises a main spare area 12 and a backup spare area. The main spare area 12 has a capacity of 26 Mega-bytes, and the backup spare area has a capacity of 120 Mega-bytes. The range of the backup spare area covers a portion of the last area (the 34th area) of the user area 14. That is, the backup spare area is included in the user area 14.

In a general operation, the user may use the above user area 14 only. There are two occasions to use the spare area for a user. One is when the DVD-RAM disc is produced and a quality inspection is performed to find out that the user area 14 is not writable. For example, as shown in FIG. 1C, the DVD tester automatically extends the user area 14 with an original compensation area 18 towards the main spare area 12. The dimension of the original compensation area 18 is equivalent to that of the original damage area 20. Therefore, to write the DVD-RAM disc, it starts from the original compensation area 18 and then enters the user area 14. While necessary, the original damage area 20 is skipped until the writing operation is complete.

The other occasion to use the spare area is when the user writes the DVD-RAM disc, the user area 14 is not writable. For example, as shown in FIG. 1D, when a damage area 24 occurs in the user area 14, the writing machine may obtain a compensation area 22 from the main spare area 12, and the compensation area 22 has a dimension the same as that of the damage area 24. Referring to FIG. 1D, when the writing machine writes along the direction that the arrow 102 points at and reaches the damage area 24, the writing machine then jumps to the in the compensation area 22 where the arrow 104 points at. After the compensation is written, the writing machine jump back to the user area 14 at the position that the arrow 106 points at and continues writing. The same steps are repeated until the writing is complete.

In the above two occasions, if the main spare area 12 is run out, the backup spare area 26 as shown in FIG. 1E is open, so that the coverage of the user area 14 is thus reduced.

In the prior technique, the total capacity of the main spare area 12 and the backup spare area 26 is 146 Mega-bytes. While the backup spare area 26 is open, the user area is reduced to 4.58 Giga-bytes. The ratio of the spare area to the user area 14 is 3.2% (146/4580=3.2%). Generally speaking, the ratio is too low for practical application since the spare area is easily run out.

SUMMARY OF THE INVENTION

The invention provides rewritable DVD-RAM disc. The location and dimension of the DVD-RAM disc is changed to enlarge the usable area. The enlarged area can be flexibly applied to the user area, the main spare area or the backup spare area.

The invention provides a rewritable DVD-RAM disc with a track pitch of 0.615 microns, and a diameter of 120 mm. The DVD-RAM disc comprises a lead-out area starting side and a lead-out area ending side. The lead-out area starting side is distant from a center of the DVD-RAM disc with a length of about 57.889 mm to about 58.145 mm. The lead-out area ending side is distant from the center of the DVD-RAM disc with a length of about 58.493 mm to about 58.516 mm.

Both the foregoing general description and the following detailed description are exemplary and explanatory only and are not restrictive of the invention, as claimed.

DESCRIPTION OF THE PREFERRED EMBODIMENTS

Figures 1A, 1B:
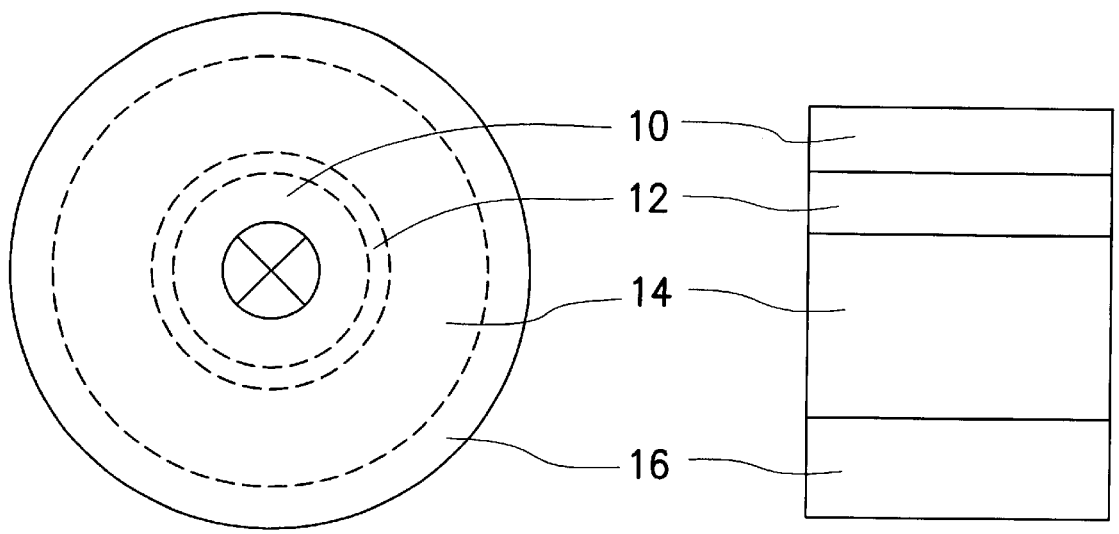
FIGS. 1A–1E show the area distribution for a conventional DVD-RAM disc.
Figures 1C, 1D:
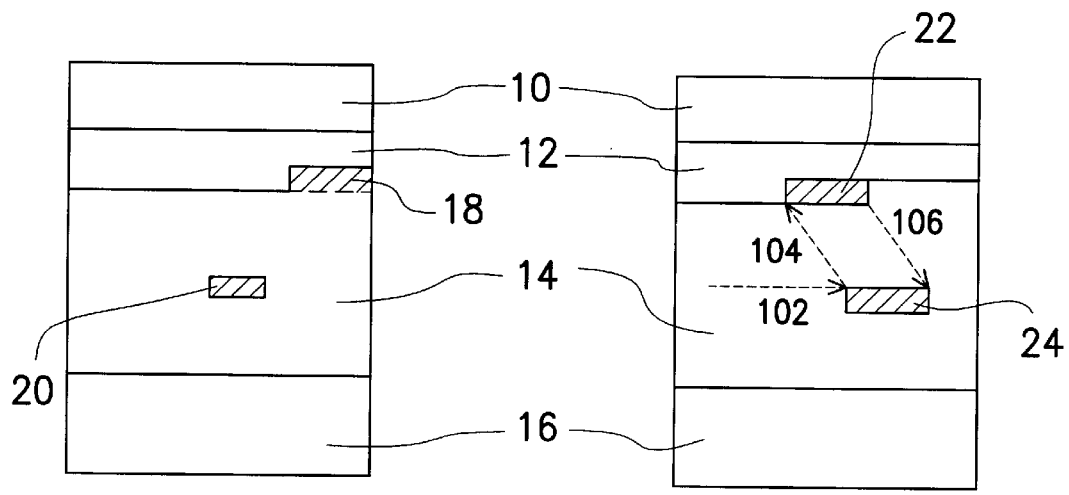
Figure 1E:
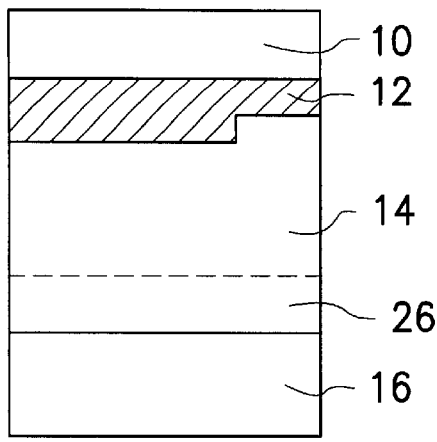
Figure 2:
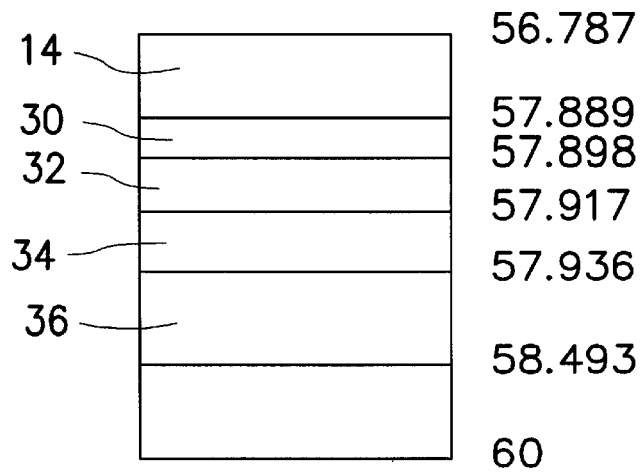
FIG. 2 shows the area distribution in a lead-out area for the conventional DVD-RAM disc as shown in FIGS. 1A–1E.

FIG. 2 shows an area distribution in a lead-out area for a conventional DVD-RAM disc. In the figure, the lead-out area 16 is adjacent to the user area 14. The lead-out area 16 comprises an other area 30, a DVD testing area 32, a disc testing area 34 and an outermost warning track area 36. The inner diameter of the other area 30 is 57.889 mm, while the outer diameter thereof is 57.898 mm. The inner diameter and the outer diameter of the DVD testing area 32 are 57.898 mm and 57.917 mm, respectively. The inner diameter and the outer diameter of the disc testing area 34 are 57.917 mm and 57.936 mm, respectively. The inner diameter of the outermost warning track area 36 is 57.936 mm and the outer diameter there is 58.493 mm.

In the design of a DVD-RAM disc, the disc testing area 34 is to provide the manufacturer to test the disc after manufacturing. The DVD testing area 32 is to provide an area for the user to test the disc before writing the disc. Under the highly rotating speed of the disc, there is a small wobbling distance at the center of the disc. Therefore, to keep the writing head on the disc, the outermost warning track area 36 is required.

Figure 3:
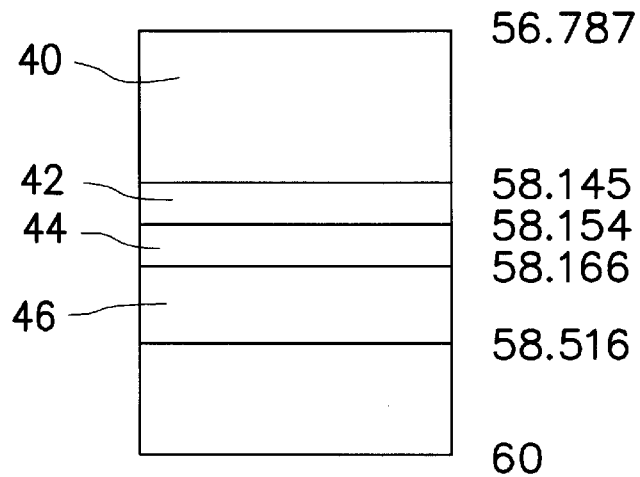
FIG. 3 shows the area distribution of a DVD-RAM disc in an embodiment according to the invention.

According to the design consideration, the invention provides a rewritable DVD-RAM disc. The lead-out area of the rewritable DVD-RAM disc is designed as shown in FIG. 3. Adjacent to the user area 40, other area 42 is located with an inner diameter of 58.145 mm (that is, the starting side of the lead-out area), and an outer diameter of 58.154 mm. In the circumference of the other area 42, a DVD testing area 44 with an inner diameter of 58.154 mm and an outer diameter of 58.166 mm is located. Adjacent to and out of the DVD testing area 44, an outermost warning track area 46 with an inner diameter of 58.166 mm (that is, the end side of the lead-out area) and an outer diameter of 58.516 mm is located.

In general practice, the disc testing area is not used. That is, even when the manufacturers are performing the quality inspection, the disc area is rarely used. Therefore, in the invention, the width of the disc testing area is zero, that is, the disc testing area is eliminated from the disc.

It is appreciated that based on the concept of the invention, the lead-out starting side and the lead-out end side are not definitely restricted to be 58.145 mm and 58.516 mm. Those designs with the lead-out starting side between 57.889 mm and 58.145 mm and the lead-out ending side between 58.493 mm and 58.516 mm are all derivatives of the invention.

A comparison between the conventional DVD-RAM disc and the DVD-RAM disc provided by the invention is shown as Table 1.

|  | Conventional DVD-RAM Disc | DVD-RAM Disc or The Invention |
|---|---|---|
| Width of The Outermost Track Area (mm) | 0.557 | 0.35 |
| Width of The Disc Testing Area (mm) | 0.019 | 0 |
| Width of The DVD Testing Area (mm) | 0.019 | 0.012 |
| Width of The 34$^{th}$ Area (mm) | 1.012 | 1.358 |
| Capacity of The 34$^{th}$ Area (MB) | 216.5 | 266.8 |
| Capacity of The Backup Spare Area (MB) | 120 | 170 |
| Capacity of The Total Spare Area (MB) | 146 | 196 |
| Capacity of The Disc (MB) | 4726 | 4776 |
| Capacity of The User Area After Opening The Backup Spare Area (MB) | 4580 | 4580 |
| Ratio of The Spare Area to The User Area After Opening The Backup Spare Area | 3.2 | 4.3 |

By the change made to the lead-out area in the invention, the capacity of the DVD-RAM disc is increased with a capacity of 50 MB. From the comparison of Table 1, the increased capacity is applied to the backup spare area in the user area, so that the capacity ratio of the spare area to the user area is increased from 3.2% to 4.3%.

The increase of capacity is not restricted to be applied to the backup spare area. It can also be applied to the user area or the main spare area. While applying the increased capacity to the user area, the usable area of the user is increased. While the increased capacity is applied to the main spare area, not only the capacity ratio of the spare area to the user area is increased to 4.3%, but also the timing or occasion for using the backup spare area is postponed or delayed. Therefore, the user can have a longer time to use a larger user area.

According to the above description, the invention changes the location and dimension of the 34$^{th}$ area of the user area in a DVD-RAM disc to enlarge the usable area. The enlarged area can be applied flexibly to the user area, the main spare area or the backup area.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A rewritable DVD-RAM disc with a track pitch of 0.615 $\mu$m and a diameter of 120 mm, comprising:
    a lead-out area starting side, the lead-out starting side has a distance to a center of the DVD-RAM disc between about 57.889 mm and 58.145 mm; and
    a lead-out area ending side, the lead-out ending side has a distance to the center of the DVD-RAM disc between about 58.493 mm and 58.516 mm.

2. The DVD-RAM disc according to claim 1, wherein an area between the lead-out starting side and the lead-out ending side comprises a lead-out area.

3. The DVD-RAM disc according to claim 2, wherein by changing a range of the leading-out area, a capacity of the DVD-RAM disc is increased.

4. The DVD-RAM disc according to claim 3, wherein the increased capacity is added into a user area of the DVD-RAM disc.

5. The DVD-RAM disc according to claim 3, wherein the increased capacity is added into a backup spare area of the DVD-RAM disc.

6. The DVD-RAM disc according to claim 3, wherein the increased capacity is added into a main spare area of the DVD-RAM disc.

7. A rewritable DVD-RAM disc, comprising:
    a user area;
    an other area, adjacent to and encircling the user area;
    a DVD testing area, adjacent to and encircling the other area; and
    an outermost warning track area, adjacent to and encircling the DVD testing area.

8. The DVD-RAM disc according to claim 6, wherein the DVD-RAM disc has a track pitch of 0.615 $\mu$m and a diameter of 120 mm.

9. The DVD-RAM disc according to claim 7, wherein the other area has an inner diameter of 58.145 mm as a lead-out area starting side, and the outermost warning track area has an outer diameter of 58.516 mm as a lead-out area ending side.

10. The DVD-RAM disc according to claim 7, wherein the other area has an inner diameter of 58.145 mm and an outer diameter of 58.154 mm.

11. The DVD-RAM disc according to claim 7, wherein the DVD testing area has an inner diameter of 58.154 mm and an outer diameter of 58.166 mm.

12. The DVD-RAM disc according to claim 7, wherein the outermost warning track area has an inner diameter of 58.166 mm and an outer diameter of 58.516 mm.

13. A rewritable DVD-RAM disc, comprising:
    a lead-in area;
    a main spare area out of the lead-in area;
    a user area out of the main spare area;
    a backup spare area within the user area;
    a lead-out area adjacent to and out of the user area; wherein
    the lead-out area comprises a disc testing area with a zero width.

14. The DVD-RAM disc according to claim 13, wherein the lead-out area further comprises:
    an other area adjacent to and out of the user area;
    a DVD testing area adjacent to the other area; and
    an outermost warning track area adjacent to the DVD testing area.

15. The DVD-RAM disc according to claim 12, wherein the DVD-RAM disc has a track pitch of 0.615 $\mu$m and a diameter of 120 mm.

16. The DVD-RAM disc according to claim 13, wherein the lead-out area has a lead-out starting side with a distance between 57.889 mm and 58.415 mm to a center of the DVD-RAM disc and a lead-out ending side with a distance between 58.493 mm and 58.516 mm to the center of the DVD-RAM disc.

* * * * *